Feb. 20, 1923.  1,446,079
T. E. WOOD
ROTARY ENGINE
Filed Mar. 12, 1921  3 sheets-sheet 1

Inventor
THOMAS E. WOOD

By
Attorney

Feb. 20, 1923.

T. E. WOOD 1,446,079

ROTARY ENGINE

Filed Mar. 12, 1921

Inventor
THOMAS E. WOOD

By

[signature] Attorney

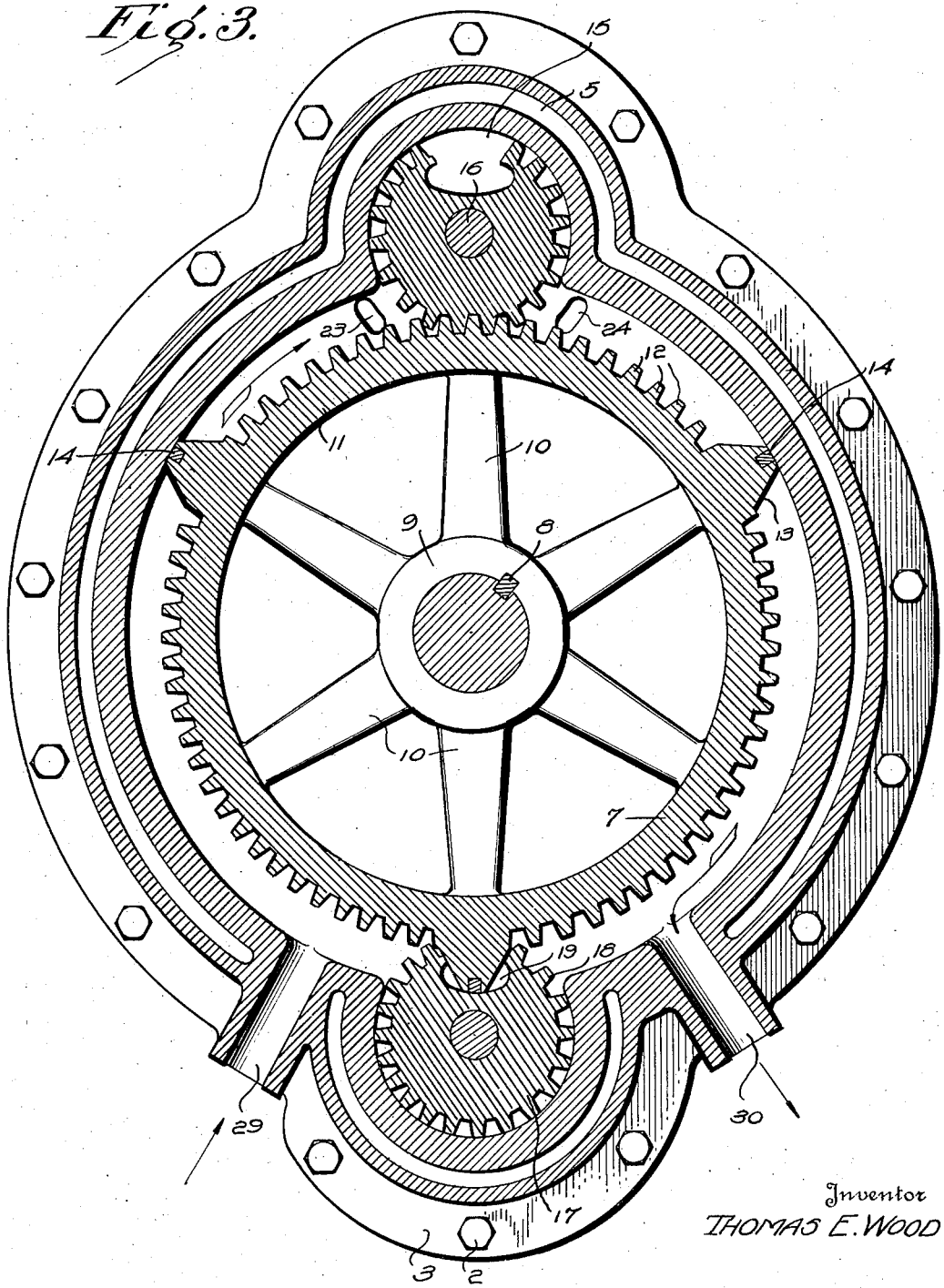

Patented Feb. 20, 1923.

1,446,079

UNITED STATES PATENT OFFICE.

THOMAS E. WOOD, OF GREAT FALLS, MONTANA, ASSIGNOR OF ONE-HALF TO SHIRLEY S. FORD, OF GREAT FALLS, MONTANA.

ROTARY ENGINE.

Application filed March 12, 1921. Serial No. 451,680.

*To all whom it may concern:*

Be it known that I, THOMAS E. WOOD, a citizen of the United States, residing at Great Falls, in the county of Cascade and State of Montana, have invented certain new and useful Improvements in Rotary Engines, of which the following is a specification.

This invention relates to rotary engines, and, it comprises a casing, a rotor mounted in said casing, said rotor being provided with spaced projections extending to the wall of the casing and dividing the interior into a plurality of chambers, explosion chambers arranged opposite said casing, a pair of openings connecting each of said explosion chambers to the interior of said casing, and a rotary valve having an opening adapted to register with said openings to permit communication between said chamber and said casing.

In the present invention, I have provided a rotary internal combustion engine wherein the revolution of the rotor draws the gas into the casing, the interior of the casing being divided into chambers by projections carried on the rotor. The rotor is provided with gear teeth adapted to mesh with a gear arranged at the top of the casing, thereby forming a compression space in which the gases are compressed. The compressed gases are delivered to an explosion chamber arranged adjacent the casing where they are fired and returned to the casing behind the projecting member to cause rotation of the rotor.

The construction provides an engine having no reciprocating parts in which vibration is reduced to a minimum. The power of the gases is multiplied by the increase in leverage provided, and uniform suction in the intake pipe is obtained at all times.

In the accompanying drawings, I have shown one embodiment of the invention. In this showing:

Figure 3 is a similar view on line 3—3 of Figure 1.

Figure 1:
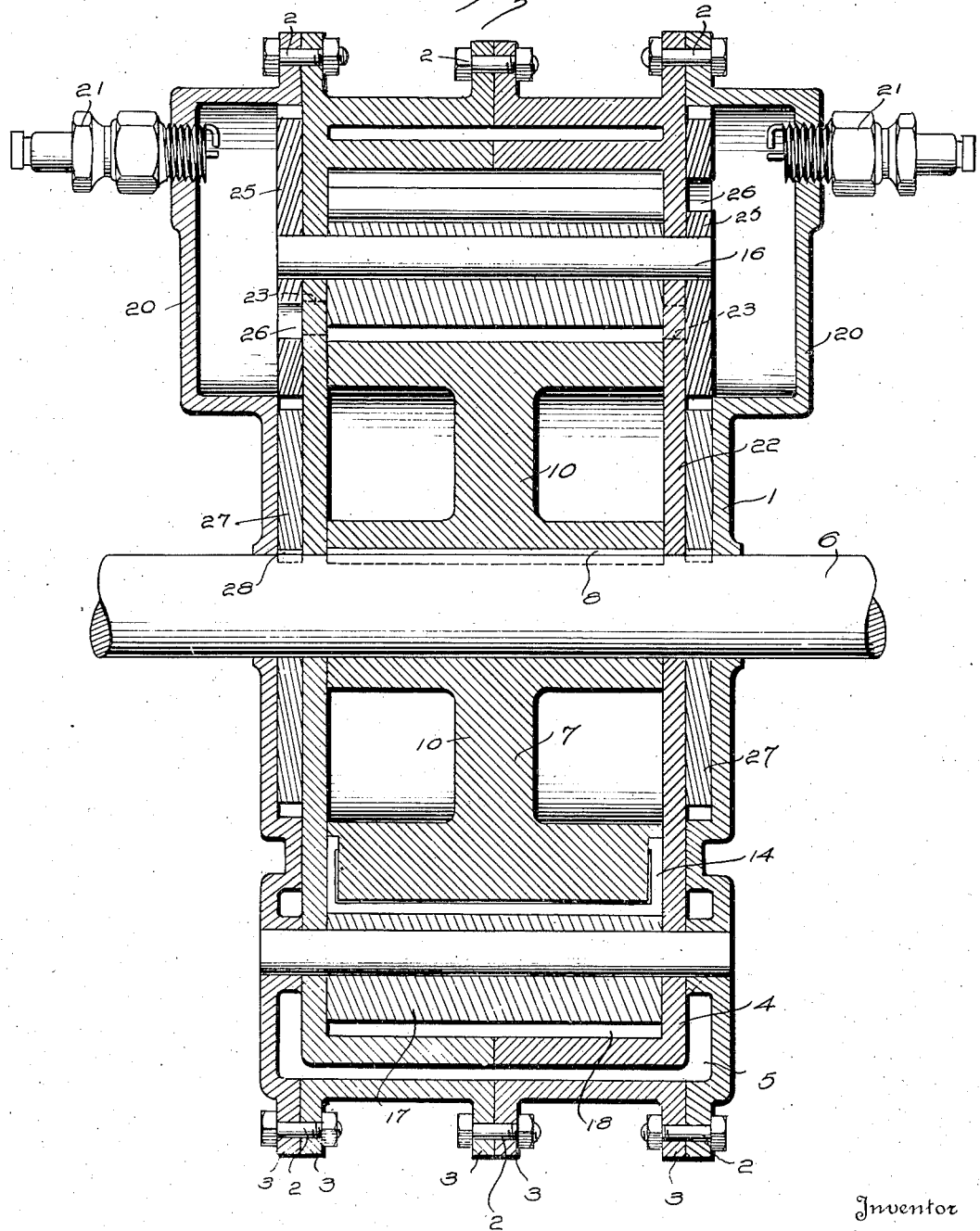
Figure 1 is a vertical transverse sectional view.

Referring to the drawings, the reference numeral 1 designates a casing which, as shown, is formed in sections secured to each other by means of bolts 2, the various sections of the casing being provided with flanges 3 having openings for the reception of these bolts. The casing is provided with an inner spaced wall 4, providing a water space 5 for cooling.

A main shaft 6 extends through the casing and a rotor 7 is mounted on this shaft, keyed thereto, as at 8. As shown, the rotor comprises a hub 9, spokes 10, and rim 11. The outer periphery of the rim is provided with gear teeth 12, and with a plurality of enlarged teeth or projections 13, which extend outwardly and engage the inner wall of the casing. As shown, the projections may be provided with packing in the form of strips or rings 14, to pevent leakage. The top and bottom of the casing is provided with recesses 15 and a shaft 16 is arranged in each of these recesses. A rotating member 17 is loosely mounted on this shaft, the member being provided with gear teeth 18 adapted to mesh with the gear teeth 12 of the rotor, and being further provided with a recess 19, for the reception of the enlarged tooth or projection 13. The recess 19 is shaped to snugly receive the projection 13 to prevent communication between the casing on each side of said projection.

Explosion chambers 20 are formed adjacent the upper recess 15 and arranged at each side of the casing. Each of these chambers is provided with a suitable igniting device 21. The side wall 22 of the inner section 4 of the casing is provided with a pair of openings 23 and 24, establishing communication between the interior of the casing and the explosion chamber. A gear 25 is loosely mounted on the shaft 16 and is provided with an opening 26 adapted to register with the openings 23 and 24 to permit communication between the interior of the casing and the explosion chamber. This gear is driven by means of a gear 27, keyed to the main shaft, as at 28, and arranged between the walls 1 and 4 of the casing.

The casing is provided with an inlet opening 29 and an exhaust opening 30.

The rotor may be provided with any suitable number of enlarged teeth or projections 14. The rotating member 17 is geared to make as many revolutions to one revolution of the rotor equal to the number of enlarged teeth. As shown, the rotor is provided with three enlarged teeth, and the member 17 is adapted to revolve at three times the speed of the rotor whereby the recess 19 will be in position to receive the enlarged tooth, as it comes into position adjacent the member 17. As a pair of explosion chambers are provided and alternate explosions take place in each chamber, the number of explosions in either chamber for one revolution of the rotor will be equal to one-half the number of projections on the rotor. The gear 25 makes a complete revolution for each explosion in the explosion chamber 20, and in the construction disclosed, revolves three times to two revolutions of the rotor.

When the rotor, revolving in the direction indicated by the arrow in Figure 3 of the drawings, reaches a position where one of the projections passes the inlet 29, a charge is drawn in by suction and this charge is confined between the projection and the next projection on the rotor. As the rotating member 17 extends into the space between the rotor and the casing, a chamber is formed between it and the approaching projecting member. The gas confined between a pair of projecting members is thus compressed when the first projection passes the rotating member 17 in the space between the rotating member and the approaching projection. This compression continues until the opening 26 alines with the opening 23 and the gas is then delivered into the explosion chamber and fired. Further revolution of the gear 25 causes the openings 24 and 26 to register and the exploded charge is returned to the casing behind the projecting member, exerting force thereon to revolve the rotor. When the projecting member passes the exhaust opening 30, the burned gases are discharged.

Figure 2:
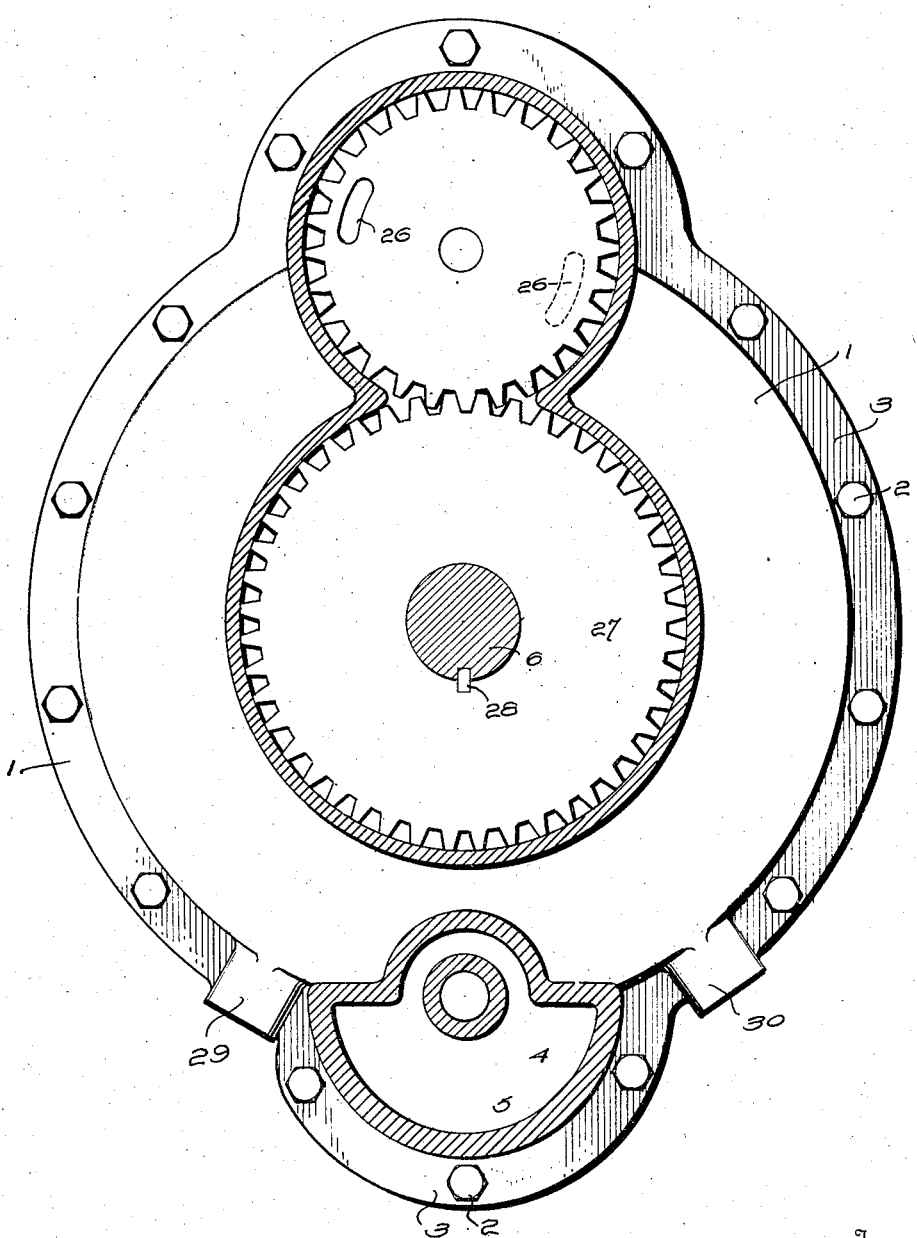
Figure 2 is a vertical sectional view on line 2—2 of Figure 1.

Referring to Figure 2 of the drawings, it will be noted that the openings 26 in the two gears 25 are arranged diametrically opposite each other. After an explosion takes place in one of the exploding chambers, the opening 26 in the valve or gear 25 will not be brought into communication with the opening 23 when the next charge is compressed, due to the relative speed of rotation, but the opening in the valve or gear on the opposite side of the rotor will aline with the opening 23 in the wall of the casing to permit the charge to be introduced into the other exploding chamber.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A rotary engine comprising a substantially circular casing having an inlet opening and an exhaust opening, a rotor mounted therein and spaced from the casing, said rotor being provided with gear teeth and being further provided with a plurality of spaced enlarged teeth extending to the wall of the casing and dividing the interior into chambers, said casing being provided with an offset portion, a rotating member arranged therein, said rotating member being provided with teeth meshing with the gear teeth of the rotor and being further provided with a recess for the reception of said enlarged teeth, said rotating member and said enlarged teeth being adapted to compress a charge of gas as the enlarged tooth approaches the rotating member in its revolution, an exploding chamber arranged adjacent said offset portion of the casing, the wall of the casing being provided with a pair of openings communicating with the exploding chamber, and a rotating valve normally closing said openings, said valve being provided with an opening adapted to register with one of said openings in the wall of the casing to deliver a charge of compressed gas to said exploding chamber, and with the second opening to return the exploded charge to said casing.

In testimony whereof I affix my signature in presence of two witnesses.

THOMAS E. WOOD.

Witnesses:
S. S. FORD,
F. R. SEARLES.